(12) United States Patent
Jenkins

(10) Patent No.: US 6,590,170 B1
(45) Date of Patent: Jul. 8, 2003

(54) PORTABLE LATCH

(75) Inventor: Walter O. Jenkins, Crafton, PA (US)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 09/389,671

(22) Filed: Sep. 2, 1999

(51) Int. Cl.$^7$ .............................. H01H 9/20
(52) U.S. Cl. .................. 200/50.21; 200/50.21; 200/50.22; 200/50.23; 200/60.24; 200/50.25; 200/50.26; 200/50.27; 200/361; 200/605; 200/606
(58) Field of Search ................ 200/43.01, 43.16, 200/43.19, 43.21, 50.17, 50.21, 50.22, 50.23, 50.24, 50.25, 50.26, 50.27, 318, 321, 325; 361/605, 606, 607, 608, 615, 616, 617

(56) References Cited

U.S. PATENT DOCUMENTS 3,235,681 A * 2/1966 Pokorny et al.
4,486,814 A * 12/1984 Ishikawa et al. ............. 361/339
6,244,891 B1 * 6/2001 Robbins et al. ............. 439/372

* cited by examiner

Primary Examiner—Elvin Enad
Assistant Examiner—Jennifer A. Poker
(74) Attorney, Agent, or Firm—Martin J. Moran

(57) ABSTRACT

A latch kit comprising a member with at least one hook end, a tension member, and a hook plate. The hook plate is connected to the member by a tension member. The kit is intended to be used in conjunction with an industrial circuit breaker which is secured in a cell by a catch plate. When the hook plate is attached to the circuit breaker, the hook end can be used to support the circuit breaker's catch plate handle in the open position so that the circuit breaker can be extracted from the cell.

5 Claims, 3 Drawing Sheets

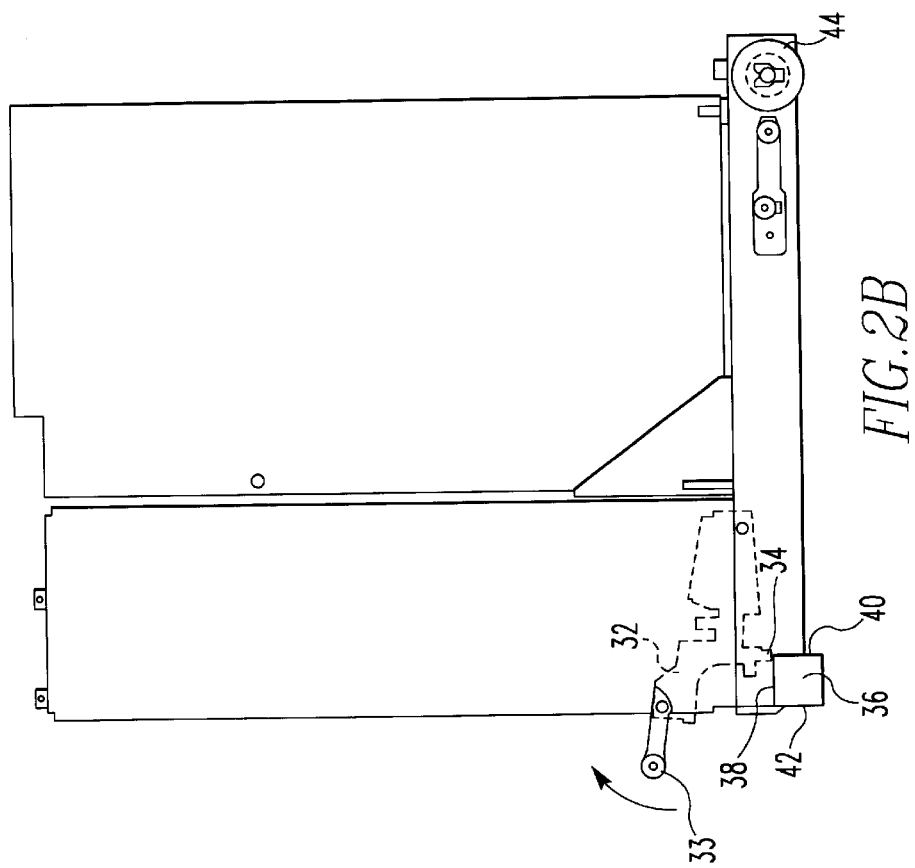
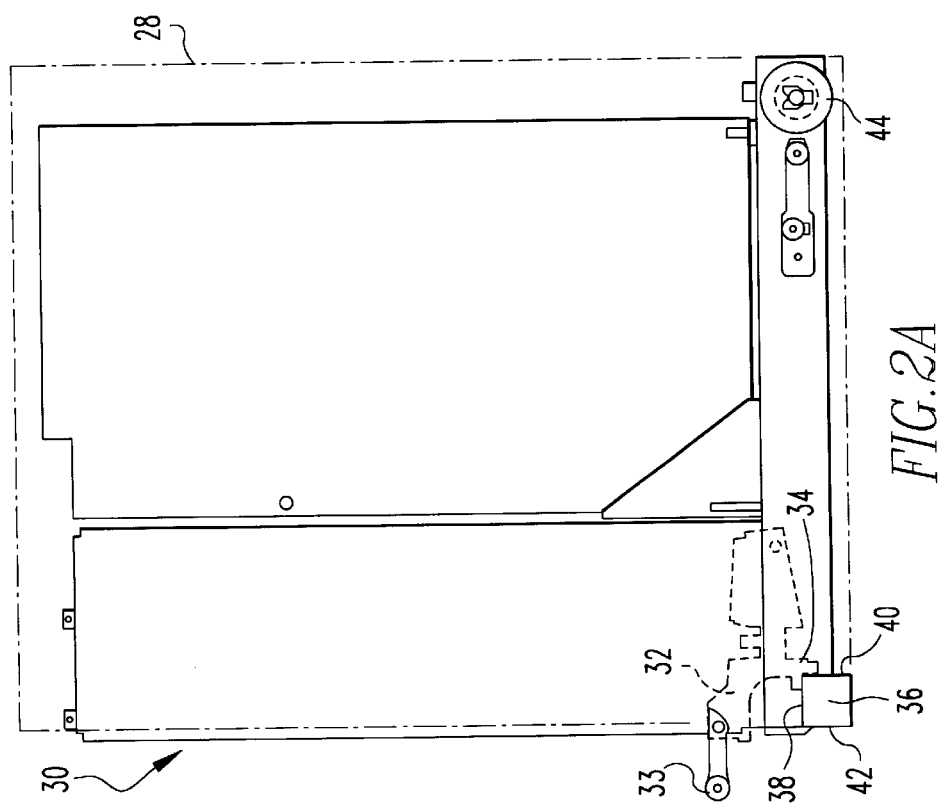

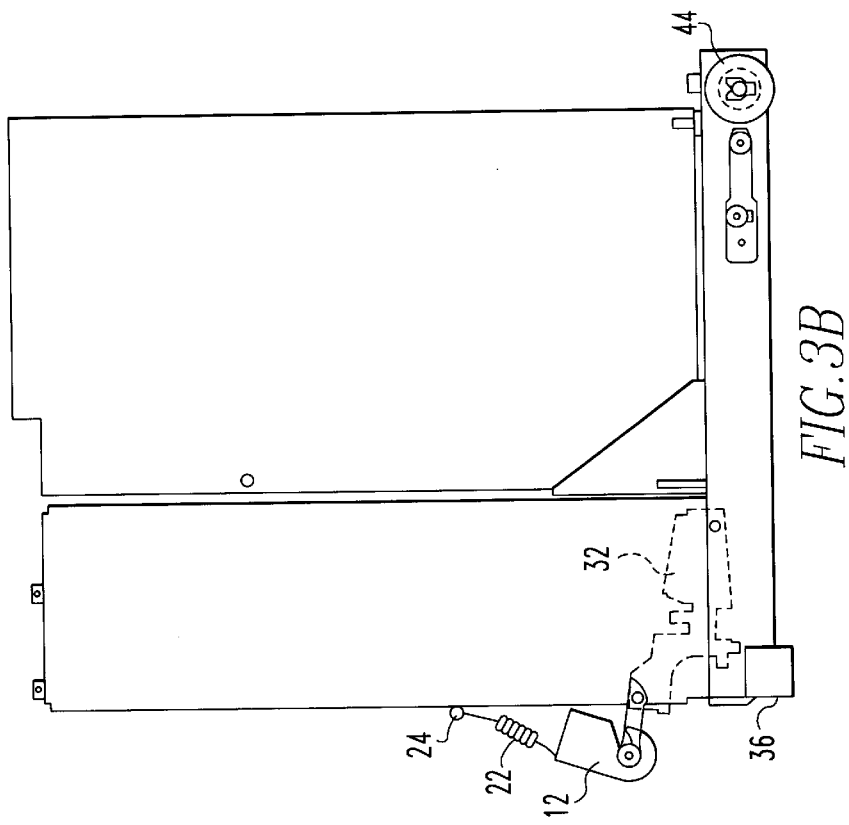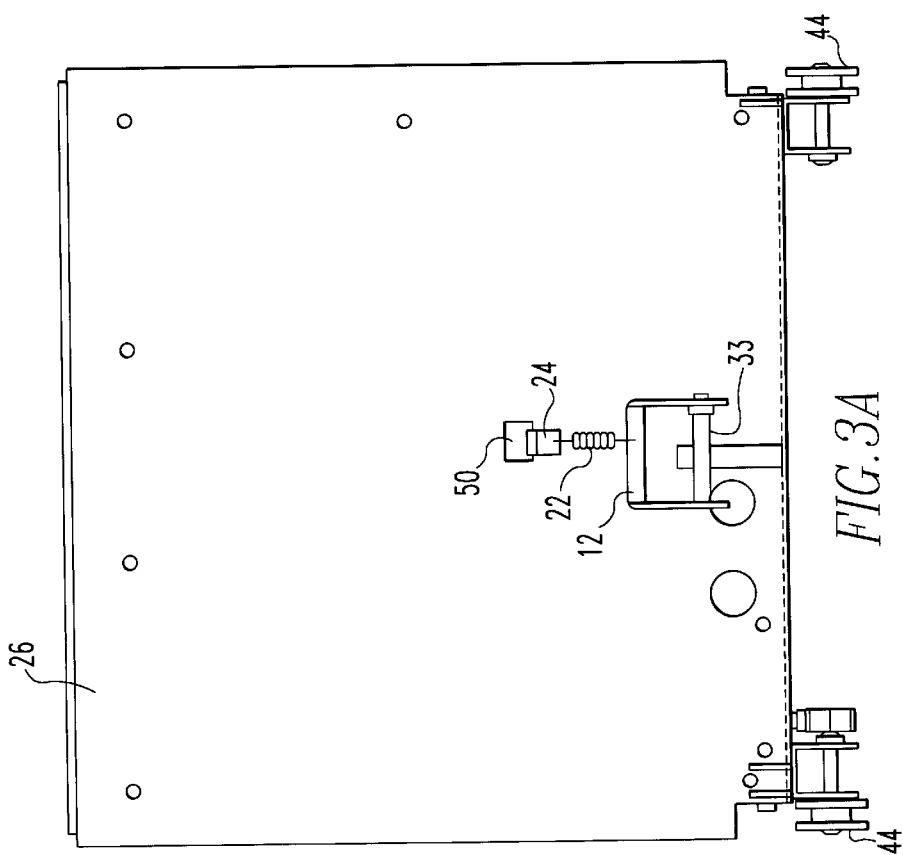

PORTABLE LATCH

BACKGROUND OF THE INVENTION

1. Field of the Invention

This invention relates to latches. Specifically, this invention relates to a portable latch which can be used to hold a levering-in handle on a circuit breaker in the open or ready-for-service position.

2. Background Information

An industrial capacity circuit breaker is housed in a cell while in use. The circuit breaker is large, heavy, generally rectangular, and has wheels to allow a person to insert or remove the circuit breaker from the cell. To secure the circuit breaker in the cell, a catch plate is positioned along the front panel of the circuit breaker. The catch plate has a handle and is pivotably attached to the circuit breaker. The catch plate works by resting against a catch bar which is part of the cell. While in this position the handle is said to be in the closed position. To remove the circuit breaker from the cell, an operator must lift the handle so that the catch plate pivots free, or open, from the catch bar. The circuit breaker may then be withdrawn from the cell. The handle provides a convenient hand-hold for moving a circuit breaker and is often called a "levering-in handle."

For safety reasons, and sometimes due to the weight, circuit breakers are extracted from a cell using a crane or other mechanical device that allows the operator to stand at a distance. The catch plate makes this operation more difficult as one operator must hold the catch plate handle up while another operator operates the crane. Accordingly there is a need for a latch to hold the handle of the catch plate in the open position while an operator withdraws a circuit breaker from a cell using a crane or other device.

Because many circuit breakers that are currently in use do not have a latch for holding the catch plate in the open position, there is a further need for a latch handle that can be attached to existing circuit breakers.

Additionally, because circuit breakers without latches are often disposed in banks of cells, there is a need for a latch kit that can be easily transported and attached to different circuit breakers.

SUMMARY OF THE INVENTION

These and other needs are satisfied by the invention which is directed to a latch kit which can be transported from one circuit breaker to another. The latch kit has double hook which is adapted to hold the catch plate handle and a hook plate which can be attached to the front panel of a circuit breaker. The double hook and the hook plate are attached to each other by a tension member. The tension member provides sufficient force to hold the catch plate handle in the open position when the hook plate is attached to the circuit breaker front panel and the double hook has engaged the catch plate handle.

BRIEF DESCRIPTION OF THE DRAWINGS

FIGS. 2A and 2B are side views of the prior art circuit breakers and catch plates. Specifically, FIG. 2A shows the catch plate in the closed position and FIG. 2B shows the catch plate in the open position.

FIGS. 3A and 3B are views of the portable latch kit attached to a circuit breaker. Specifically, FIG. 3A shows a front view of the circuit breaker and FIG. 3B shows a side view.

DETAILED DESCRIPTION OF THE INVENTION

Figure 1:
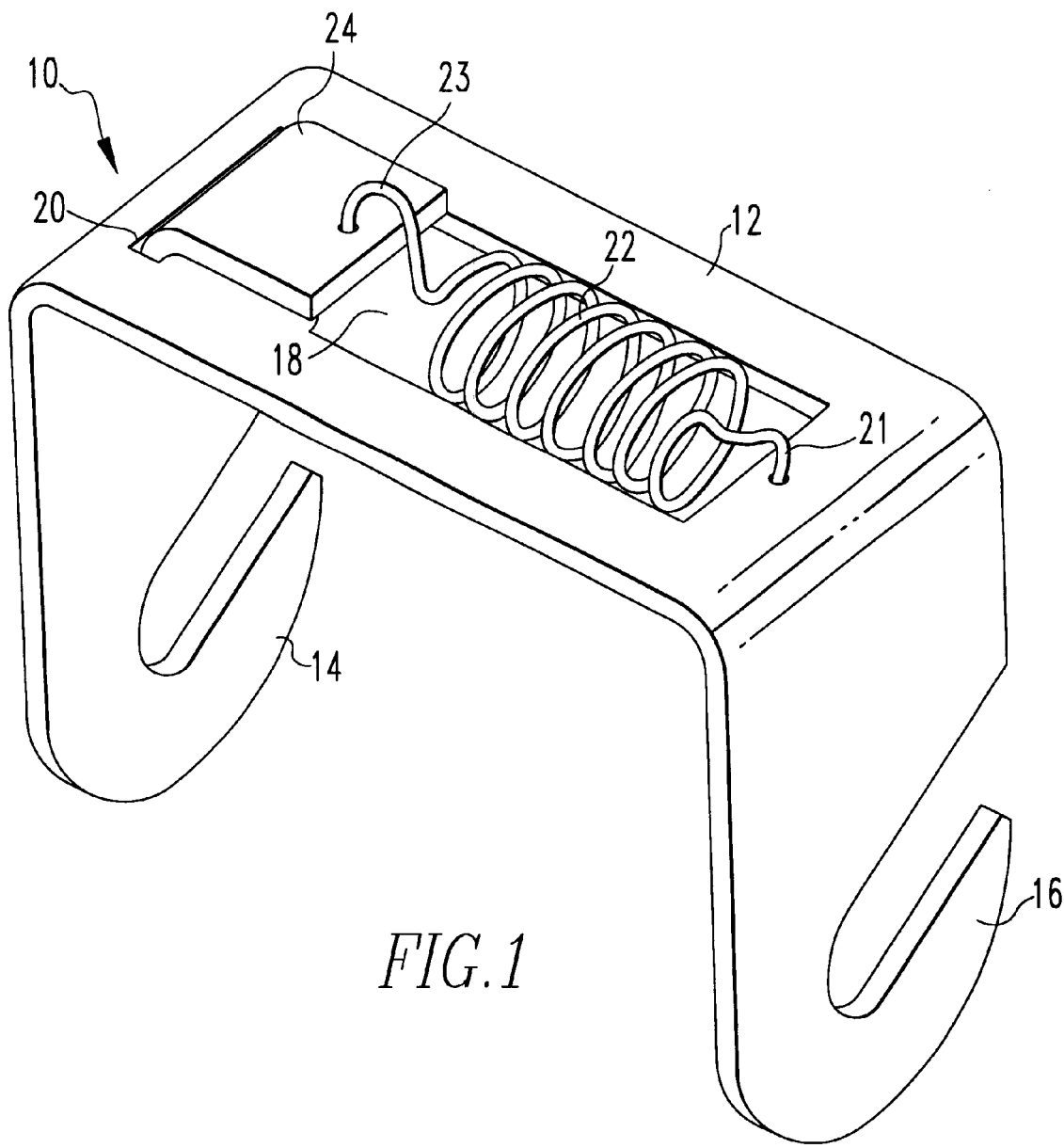
FIG. 1 is a perspective view of the portable latch kit.

Referring to FIG. 1, there is shown a latch kit 10 according to the preferred embodiment of this invention. The latch kit 10 includes a U-shaped member 12 which termninates in a hook at either end 14, 16. Attached to the U-shaped member is a tension member 22. The tension member 22 can be, but is not limited to, members such as springs, string, bungee cords, or chains. In the preferred embodiment, the tension member 22 is a coil spring. The tension member 22 has a first end 21 and a second end 23. The first end 21 of the tension member 22 is attached to the U-shaped member 12. Attached to the second end 23 of tension member 22 is a J-shaped hook plate 24. When the latch kit is not in use, the hook plate 24 is conveniently attached to the U-shaped member and kept in place by the tension member 22. In the preferred embodiment, the base of the U-shaped member 12 has a cavity 18 and a slot 20. The tension member 22 can be disposed within the cavity 18 and the hook plate 24 attached to the slot 20.

Referring to FIGS. 2 and 3, there is shown a circuit breaker 30. The circuit breaker 30 has a front face 26. Such circuit breakers are typically disposed within a cell 28 (shown in ghost). The cell 28 forms an enclosure having one open side. The circuit breaker 30 can be inserted or extracted from the cell 28 through the open side. The cell 28 has a block 36 along the outer portion of the lower edge of the cell 28. The cell block 36 has an upper surface 38, an inside surface 40, and an outside surface 42. The circuit breaker 30 has a catch plate 32 (shown in ghost) which is pivotably attached to the circuit breaker 30. The catch plate 32 has an exposed handle 33. The catch plate 32 also has at least one two-fingered L-shaped projection 34. As shown in FIG. 2A, when the circuit breaker 30 is within a cell 28, the catch plate 32 typically is in the closed position where the L-shaped projection 34 rests with one finger on the cell block upper surface 38 and the other finger contacting the cell block inside surface 40. The circuit breaker 30 may be mounted on rails (not shown) in the cell 28. The circuit breaker 30 may also have wheels 44 to aid in moving the circuit breaker 30 in and out of the cell 28. As shown in FIG. 3A, the circuit breaker front panel 26 has at least one opening 50 adjacent to the catch plate handle 33.

As shown in FIG. 2B, to remove the circuit breaker 30 from the cell 28, the catch plate 32 must be pivoted until the fingers of the L-shaped projection 34 clear the cell block 36. This is the catch plate's 32 open position. Once the catch plate 32 is in the open position, the circuit breaker 30 may be pulled from the cell 28. After the circuit breaker 30 has been removed from the cell 28 and the catch plate 32 is returned to the closed position, the L-shaped projection 34 will block insertion into the cell 28 by contacting the cell block outside surface 42. Thus, insertion of the circuit breaker 30 into the cell 28 also requires the catch plate 32 to be in the open position.

To use the portable latch kit 10, an operator would detach the hook plate 24 from the slot 20 and attach the hook plate 24 to the circuit breaker front panel opening 50. Once the hook plate 24 is attached to the front panel opening 50, the U-shaped member 12 dangles from tension member 22 in proximity to catch plate handle 33. The operator would lift handle 33 so that it is in the open position. The operator then captures handle 33 in hook ends 14, 16. The tension member 22 maintains the handle 33 in the open position. The operator may the attach a crane or other retraction device to the circuit breaker 30. Once the operator withdraws to a safe distance, he or she may then operate the crane or other device to extract the circuit breaker 30 from the cell 28.

After the circuit breaker 30 has been removed from cell 28, the latch kit 10 may be removed. The latch kit 10 is not intended to be a permanent part of the circuit breaker 30. Insertion of the circuit breaker 30 into cell 28 is typically performed by lifting handle 33 and sliding the circuit breaker 30 into cell 28. This operation may be safely performed without the use of the latch kit 10.

While a specific embodiment of the invention has been disclosed above, it will be appreciated by those skilled in the art that various modifications and alternatives could be developed in light of the over all teachings of the disclosure. For example, the U-shaped member could be replaced with a flat member having a single hook end. This device, however, would be less stable than the preferred embodiment. Accordingly, the particular arrangement disclosed is meant to be illustrative only and not limiting as to the scope of the invention which is to be given the full breadth of the claims below and any equivalent thereof.

What is claimed is:

1. An apparatus comprising:
    a circuit breaker having a front panel;
    a catch plate pivotably attached to said circuit breaker having a handle extending from said front panel;
    said catch plate movable by said handle between an open position and a closed position;
    at least one opening on said front panel above said handle;
    a portable latch comprising:
        a U-shaped member having a hook at both ends;
        a hook plate;
        said hook plate connected to said member by a tension member;
        said hook plate releasably attached to said opening;
        said hooks supporting said handle in said open position.

2. The apparatus of claim 1 wherein said tension member is a spring.

3. The apparatus of claim 1 wherein said tension member is a bungee.

4. The apparatus of claim 1 wherein said tension member is a string.

5. The apparatus of claim 1 wherein said tension member is a chain.

* * * * *